(12) United States Patent
Lupton et al.

(10) Patent No.: US 8,994,929 B2
(45) Date of Patent: Mar. 31, 2015

(54) METHOD AND APPARATUS FOR MEASURING SEISMIC PARAMETERS OF A SEISMIC VIBRATOR

(75) Inventors: Robert Martindale Lupton, Alberta (CA); William Eric Westwood, Calgary (CA)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 14/237,638

(22) PCT Filed: Aug. 7, 2012

(86) PCT No.: PCT/US2012/049810
§ 371 (c)(1),
(2), (4) Date: Feb. 7, 2014

(87) PCT Pub. No.: WO2013/022866
PCT Pub. Date: Feb. 14, 2013

(65) Prior Publication Data
US 2014/0151147 A1    Jun. 5, 2014

Related U.S. Application Data

(60) Provisional application No. 61/521,544, filed on Aug. 9, 2011.

(51) Int. Cl.
*G01B 11/16* (2006.01)
*G01V 1/16* (2006.01)
(Continued)

(52) U.S. Cl.
CPC ................ *G01V 1/16* (2013.01); *G01V 1/0475* (2013.01); *G01H 9/004* (2013.01); *G01V 8/16* (2013.01); *G01V 1/226* (2013.01)
USPC .......................................................... 356/32

(58) Field of Classification Search
CPC ... G01H 9/004; G01H 9/006; G01B 2290/25; G01B 9/02007; G01B 9/02027; G01B 2290/45; G01B 9/02002; G01B 9/02004; G01B 9/02067; G01B 2290/60; G01B 9/02014; G01B 9/02025; G01B 9/0207; G01B 6/0205
See application file for complete search history.

(56) References Cited

U.S. PATENT DOCUMENTS

| 4,184,144 A | 1/1980 | Rickenbacker |
| 4,664,223 A | 5/1987 | Huizer et al. |

(Continued)

FOREIGN PATENT DOCUMENTS

| GB | 2364380 A | 1/2002 |
| WO | 2009158630 A1 | 12/2009 |

(Continued)

OTHER PUBLICATIONS

PCT International Search Report, Application No. PCT/US2012/049810 dated Jan. 22, 2013.

(Continued)

*Primary Examiner* — Michael P Stafira

(57) ABSTRACT

Apparatus and techniques for measuring seismic parameters, such as ground force, of a seismic vibrator used for generating seismic signals through a geological formation are provided. The seismic vibrator has a base plate positionable adjacent a ground surface of the geological formation. A sensor pad may be provided with an optical cable positionable between the base plate of the seismic vibrator and the ground surface of the geological formation, a laser for passing a light through the optical cable, and a detector for detecting disturbances in the laser light whereby a ground force applied to the ground surface may be determined.

10 Claims, 4 Drawing Sheets

(51) Int. Cl.
*G01V 1/047* (2006.01)
*G01H 9/00* (2006.01)
*G01V 8/16* (2006.01)
*G01V 1/22* (2006.01)

(56) References Cited

U.S. PATENT DOCUMENTS

| | | | |
|---|---|---|---|
| 5,493,390 A * | 2/1996 | Varasi et al. | 356/32 |
| 6,268,911 B1 | 7/2001 | Tubel et al. | |
| 6,281,489 B1 | 8/2001 | Tubel et al. | |
| 6,588,266 B2 | 7/2003 | Tubel et al. | |
| 6,693,848 B1 | 2/2004 | Ambs et al. | |
| 6,787,758 B2 | 9/2004 | Tubel et al. | |
| 6,913,079 B2 | 7/2005 | Tubel | |
| 7,040,390 B2 | 5/2006 | Tubel et al. | |
| 7,122,783 B1 * | 10/2006 | Pastore et al. | 250/227.14 |
| 7,201,221 B2 | 4/2007 | Tubel et al. | |
| 7,284,903 B2 | 10/2007 | Hartog | |
| 7,668,411 B2 | 2/2010 | Davies et al. | |
| 7,740,064 B2 | 6/2010 | McCoy et al. | |
| 7,946,341 B2 | 5/2011 | Hartog et al. | |
| 7,954,560 B2 | 6/2011 | Mathiszik et al. | |
| 2003/0094281 A1 | 5/2003 | Tubel | |
| 2004/0043501 A1 | 3/2004 | Means et al. | |
| 2006/0219009 A1* | 10/2006 | Maas et al. | 73/514.26 |
| 2007/0189658 A1* | 8/2007 | Maas | 385/12 |
| 2008/0137476 A1 | 6/2008 | Eick et al. | |
| 2009/0188665 A1 | 7/2009 | Tubel et al. | |
| 2010/0107754 A1 | 5/2010 | Hartog et al. | |
| 2010/0200744 A1 | 8/2010 | Pearce et al. | |
| 2010/0207019 A1 | 8/2010 | Hartog et al. | |
| 2010/0315630 A1 | 12/2010 | Ramos et al. | |
| 2011/0044574 A1 | 2/2011 | Strong | |
| 2011/0069302 A1 | 3/2011 | Hill et al. | |
| 2011/0088462 A1 | 4/2011 | Samson et al. | |
| 2011/0088910 A1 | 4/2011 | Mccann et al. | |
| 2011/0149688 A1 | 6/2011 | Hill et al. | |
| 2011/0185815 A1 | 8/2011 | Mccann | |
| 2011/0216996 A1 | 9/2011 | Rogers | |
| 2011/0280103 A1 | 11/2011 | Bostick | |
| 2011/0292763 A1 | 12/2011 | Coates et al. | |
| 2012/0017687 A1 | 1/2012 | Davis et al. | |
| 2012/0018149 A1 | 1/2012 | Fidan et al. | |

FOREIGN PATENT DOCUMENTS

| | | |
|---|---|---|
| WO | 2010010318 A2 | 1/2010 |
| WO | 2010034986 A1 | 4/2010 |
| WO | 2010136764 A2 | 12/2010 |
| WO | 2010136810 A2 | 12/2010 |
| WO | 2011010110 A2 | 1/2011 |
| WO | 2011039501 A2 | 4/2011 |
| WO | 2011058312 A2 | 5/2011 |
| WO | 2011058313 A2 | 5/2011 |
| WO | 2011058314 A1 | 5/2011 |
| WO | 2011058322 A2 | 5/2011 |
| WO | 2011067554 A1 | 6/2011 |
| WO | 2011076850 A1 | 6/2011 |
| WO | 2011079107 A2 | 6/2011 |
| WO | 2011141537 A1 | 11/2011 |
| WO | 2011148128 A1 | 12/2011 |

OTHER PUBLICATIONS

Shan et al, "Load Cell System Test Experience: Measuring the Vibrator Ground Force on Land Seismic Acquisition," SEG Houston 2009 Int'l Exposition and Annual Meeting.

* cited by examiner

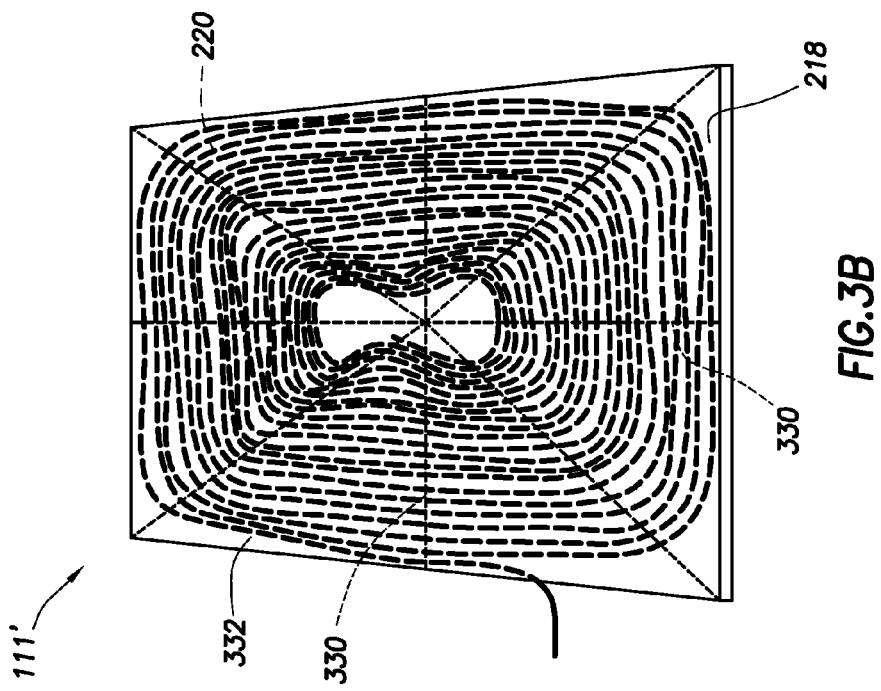
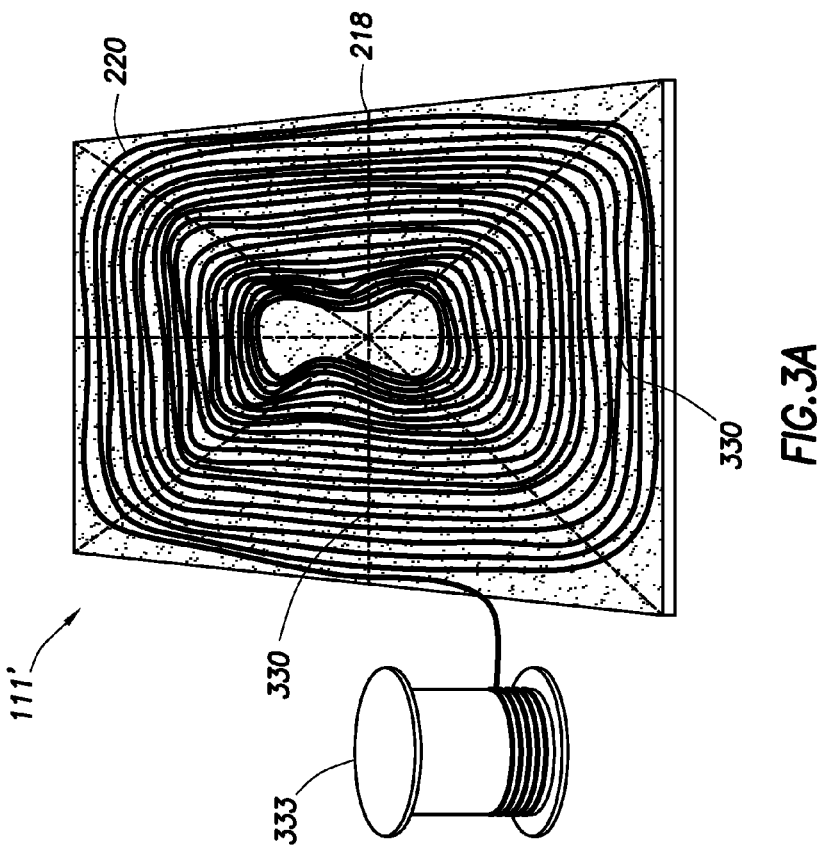

METHOD AND APPARATUS FOR MEASURING SEISMIC PARAMETERS OF A SEISMIC VIBRATOR

PRIORITY CLAIM

The present application which is a 371 application of PCT/US2012/049810, filed Aug. 7, 2012, claims priority from U.S. Provisional Application 61/521,544, filed Aug. 9, 2011.

FIELD OF THE INVENTION

The present invention relates generally to techniques for investigating geological formations. More specifically, the present invention relates to seismic vibrators and related techniques for determining parameters of seismic operations, such as a true ground force signal produced by the seismic vibrator and transmitted into the ground.

BACKGROUND OF THE INVENTION

The exploration of oil and gas may involve the investigation of geological formations to locate subsurface reservoirs. Seismic surveys may be performed to gather data and/or generate images of geological formations at locations of interest. To generate the seismic surveys, a seismic source, such as a seismic vibrator or other surface or sub-surface energy source, may be used to generate acoustic waves through the geological formations. For example, a vibroseis system may include a truck with a base plate that may be lowered to the ground and a reaction mass driven by a hydraulic system to generate the acoustic waves. A receiver may be provided to measure the acoustic waves as they rebound from the geological formations. Examples of seismic vibrators are described in U.S. Pat. Nos. 4,664,223 and 4,184,144. The measurements captured by the receiver may be analyzed to determine geological parameters and/or to generate two and/or three dimensional depictions of geological formations. This information may be used, for example, to analyze potential oil fields and/or to design well plans for producing hydrocarbons or other resources from the geological formations.

During operation, seismic vibrators may generate significant amounts of harmonic energy. Such harmonic energy may affect the signals generated by the seismic vibrators, thereby affecting measurements. Techniques have been developed to measure the ground force generated by a seismic vibrator, as described, for example, in U.S. Pat. No. 4,664,223 and in Shan et al, "Load Cell System Test Experience: Measuring the Vibrator Ground Force on Land Seismic Acquisition," SEG Houston 2009 Int'l Exposition and Annual Meeting. Ground force measurements may be analyzed to make use of harmonic energy and enhance, for example, bandwidth of signals of the seismic vibrator.

Despite the development of advanced techniques for measuring certain seismic parameters, such as ground force, there remains a need to provide enhanced seismic measurement capabilities and/or advanced techniques for further enhancing seismic operations. The present invention is directed to fulfilling these needs in the art.

SUMMARY OF THE INVENTION

In at least one aspect, the techniques herein relate to a sensor pad for measuring seismic parameters of a seismic vibrator. The seismic vibrator is for generating seismic waves through a geological formation. The seismic vibrator has a base plate positionable adjacent a ground surface of the geological formation. The sensor pad includes an optical cable positionable between the base plate of the seismic vibrator and the ground surface of the geological formation, a laser for passing a light through the optical cable, and a detector for detecting disturbances in the light whereby a ground force of the seismic vibrator may be determined.

The optical cable may be distributed over at least a portion of the base plate. The optical cable may be positionable in at least one winding along an engagement surface of the base plate. The sensor pad may also have a protective layer positionable about the optical cable. The protective layer may be neoprene molded about the optical cable, or a mat, a pad wafer, and/or an adhesive. The sensor pad may also have a securing agent. The securing agent may be a bonding agent and/or an adhesive. The optical cable may be a fiber optic cable, a microelectromechanical optical cable, and/or a distributed optical cable. The optical cable may also be a single mode fiber optic cable and/or a multi-mode fiber optic cable. The sensor pad may also have at least one sensor. The seismic parameter may be a ground force, a stress, and/or a strain.

In another aspect, the techniques herein may relate to a seismic system for measuring seismic parameters. The system may include a seismic vibrator for generating seismic waves through a geological formation and a seismic pad. The seismic vibrator has a base plate positionable adjacent a ground surface of the geological formation. The sensor pad includes an optical cable positionable between the base plate of the seismic vibrator and the ground surface of the geological formation, a laser for passing a light through the optical cable, and a detector for detecting disturbances in the light whereby a ground force of the seismic vibrator may be determined. The seismic pad may be positionable between the base plate of the seismic vibrator and the ground surface of the geological formation. The system may also have an investigation unit.

In yet another aspect, the invention may relate to a method for measuring seismic parameters. The method may involve positioning a seismic pad on a base plate of a seismic vibrator (the seismic pad comprising an optical cable, a laser, and a detector), positioning the seismic pad of the base plate adjacent a ground surface of a geological formation, generating seismic waves through the geological formation with the seismic vibrator, passing a light from the laser through the optical cable, and determining a ground force of the seismic vibrator by detecting disturbances in the light. The method may also involve providing a protective layer about the optical cable and/or securing the optical cable in position.

BRIEF DESCRIPTION OF THE DRAWINGS

So that the above recited features and advantages of the invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are, therefore, not to be considered limiting of its scope. The figures are not necessarily to scale, and certain features and certain views of the figures may be shown exaggerated in scale or in schematic in the interest of clarity and conciseness.

FIGS. 3A-3C show various schematic views of an alternate sensor pad at various stages of assembly.

DETAILED DESCRIPTION OF THE INVENTION

The description that follows includes exemplary apparatuses, methods, techniques, and instruction sequences that embody techniques of the inventive subject matter. However, it is understood that the described embodiments may be practiced without these specific details.

Techniques for generating signals through a geological formation with a seismic vibrator are provided. Such techniques involve measuring parameters, such as ground force, of the seismic vibrator. Such parameters may be used to monitor operation of the seismic vibrator and/or to enhance operation of the seismic vibrator (e.g., reduce attenuation, boost signal, enhance image resolution, etc.)

Figure 1:
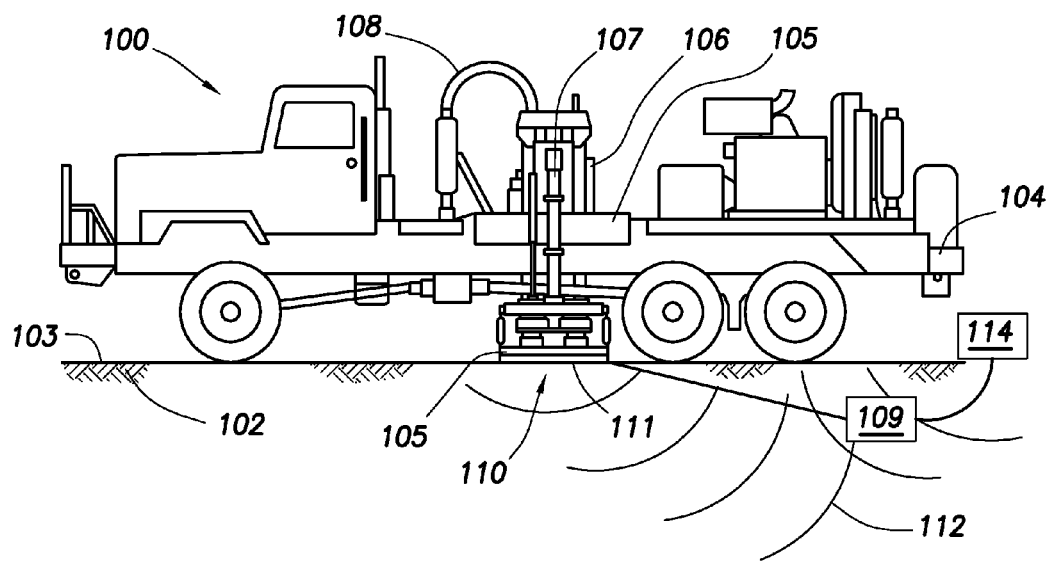
FIG. 1 shows a schematic view of a system for generating seismic signals through a geological formation having a seismic vibrator with a sensor pad for measuring seismic parameters of the seismic vibrator.

FIG. 1 depicts a seismic system (or vibrator) 100 usable for generating seismic surveys of a geological formation 102 at a field of investigation. The seismic system 100 includes a platform 104 positioned on a ground surface 103 of the geological formation 102. The platform 104 is depicted as a truck movably positionable at the geological field of investigation 102. The seismic system 100 also includes a load (or reaction mass) 106 positionable on a carrier 105 of the platform 104. The seismic system 100 has an actuator 108 (e.g., a hydraulic system) for selectively activating a piston 107 for vibrating the load 106 to generate acoustic waves through the geological formation 102. The piston 107 is selectively extendable to place a sensor pad assembly 110 at an end thereof in contact the ground surface 103. The seismic system 100 may be a conventional seismic vibrator for generating acoustic waves 112, such as those described U.S. Pat. No. 4,664,223, and provided with the sensor pad assembly 110 for enhancing measurement capabilities thereof.

The sensor pad assembly 110 has a base plate 105 with a sensor pad 111 for contact with the ground surface 103. As shown in FIG. 1, the base plate 110 may be a conventional base plate with a thin, rectangular body configured to engage the ground surface 103 and generate acoustic waves through geological formation 102 beneath the ground surface 103. The sensor pad 111 may be positioned between the base plate 105 and the ground surface 103 for measuring seismic parameters during operation of the seismic system 100 as will be described further below.

The sensor pad 111 is coupled to an investigation unit 109 for capturing and processing data from the seismic system 100. The investigation unit 109 may be, for example, a computer for receiving, storing, analyzing, displaying, communicating and/or otherwise manipulating data. Various conventional devices, such as a memory, display, etc., may also be provided in the investigation unit 109. The investigation unit 109 may also be coupled to a receiver 114 for receiving signals generated from the geological formation 104 as the seismic system 100 generates acoustic waves 112 therethrough as depicted.

Figure 2:
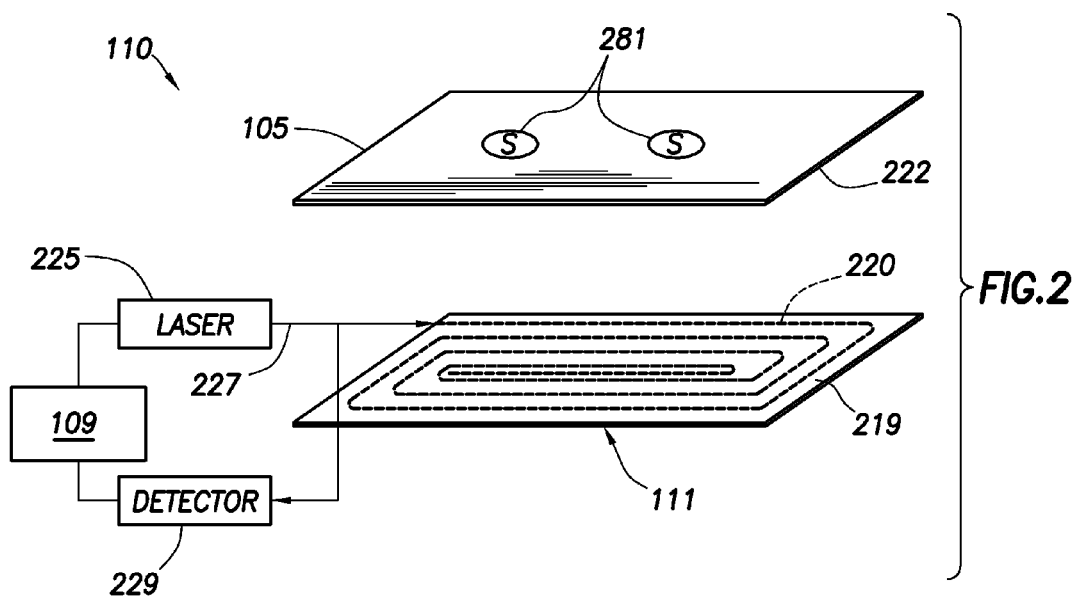
FIG. 2 shows a schematic view of a sensor pad of the system of FIG. 1.

FIG. 2 shows a schematic assembly view of the sensor pad assembly 110 of FIG. 1. The sensor pad assembly 110 includes the base plate 105 and the sensor pad 111. The base plate 105 may be conventional base plate used with conventional seismic vibrators. The base plate 105 may be a thin sheet of metal having an engagement surface 222 positionable adjacent the ground surface 103 as shown in FIG. 1.

Optionally, the base plate 105 may be provided with sensors 281 for measuring various seismic parameters of the seismic system 100 and/or the environment about the seismic system 100. The seismic parameters may be ground force, stress, strain or other measurements. For example, existing load cells, accelerometers, or other hydraulic or optical sensors may also be used to generate additional data. One or more such sensors 281 may be used separately or integrally with the optical cable 220 to provide data. The optical cable 220 may be placed on an array of load cells or other sensors 281 to measure ground force. The sensors 281 may provide, for example, measurements at controlled or discrete locations for use in combination with the continuous or integrated measurements of the optical cable 220.

The sensor pad 111 may be positioned along the engagement surface 222 of the base plate 105 for engagement with the ground surface 103. As shown, the sensor pad 111 includes an optical cable 220 positioned in a neoprene layer 219 for attachment to the base plate 105. The sensor pad 210 may be positioned with the optical cable 220 within the neoprene layer 219 for direct (or near direct) contact with the surface 103. The optical cable 220 may be integrated into the neoprene protective layer 219 to prevent damage that may be caused by the vibrator and/or the metal base plate 105 engaging the ground surface 103.

The neoprene layer 219 may be a conventional neoprene, such as the neoprene used to protect road surfaces. The optical cable 220 may be have the neoprene layer 219 molded thereabout, for example, by placing the optical cable 220 into a mold for application of the neoprene layer 219 thereon. The optical cable 220 may be positioned into a mold in the desired configuration with the neoprene layer 219 applied thereto to provide a protective layer about the optical cable 220 and form the sensor pad 111.

The optical cable 220 may be distributed along the entire engagement surface 222 in, for example, a winding arrangement as shown. The optical cable 220 may be distributed about the engagement surface 222 for achieving the maximum measurement coverage thereacross.

The optical cable 220 may be flexible to provide for desired arrangements of the optical cable 220 about the base plate 105. A desired amount of optical cable 220 may be distributed about the base plate 105. Depending on the size and arrangement selected, the optical cable 220 may generate, for example, about 200 channels per sample at about a 5 m interval, or about 1,000 or more channels/samples at about a 1 m interval. The optical cable 220 may be sufficiently flexible for placement and/or for providing measurements at a desired number of locations along the base plate 105, such as continuously over the entire engagement surface 222.

Any optical cable capable of measuring seismic parameters, such as vibration and/or other disturbances as described herein, may be employed, such as a fiber optic or MEMS (microelectromechanical) optical cable. The optical cable 220 may be, for example, a single mode or dual mode fiber optic cable. One such usable optical cable 220 may be a six strand, single mode, indoor/outdoor fiber, such as a conventional telecommunications cable. A given fiber optic cable used on a sensor pad may be, for example, a series of fiber optic cables of about 290 m in length, or a continuous length of fiber optic cable of about 1740 meters in length, for a sensor pad 220 having an engagement surface 222 of about 2 m by 1 m.

Referring to FIGS. 1 and 2, a laser 225 may be provided to emit a laser light 227 through the optical cable 220. As the optical cable 220 receives vibrations, the laser light 227 passing through the optical cable 220 may be disturbed. The optical cable 220 may have disturbances in the laser light 227 at numerous points along the optical sensor 220, and may send a signal detectable by a detector (or investigator) 229. The detector 229 may be a conventional device capable of receiving signals, such as those indicating disturbances in the laser light 227, from the optical cable 220. The detector 229 may be coupled to the investigation unit 109.

The investigation unit 109 may be used to analyze the signals from the optical cable 220. Various seismic parameters, such as vibration of the base plate 105 or vertical seismic profiling (VSP), may be determined from a change in strain of the optical cable 220, or optical strain distributed at various points along the optical cable 220. The positioning of the optical cable 220 along the base plate 105 may be used to provide a 'true' picture of ground force integrated over the engagement surface 222 of the base plate 105.

Conventional distributed acoustic sensor (DAS) techniques may be used to sample the optical cable 220, and connect to numerous channels (e.g., from about several hundred to thousands depending on the length of the optical cable 220 and pulse intervals employed). Each channel may generate data that may be used to determine ground force about the sensor pad 210. A weighted sum of the signals may be used to estimate ground force signals. The detector 229 and/or investigation unit 109 may also be used with the optical cable 220 to expand seismic bandwidth from about zero to about 10,000 Hz.

Figure 3C:
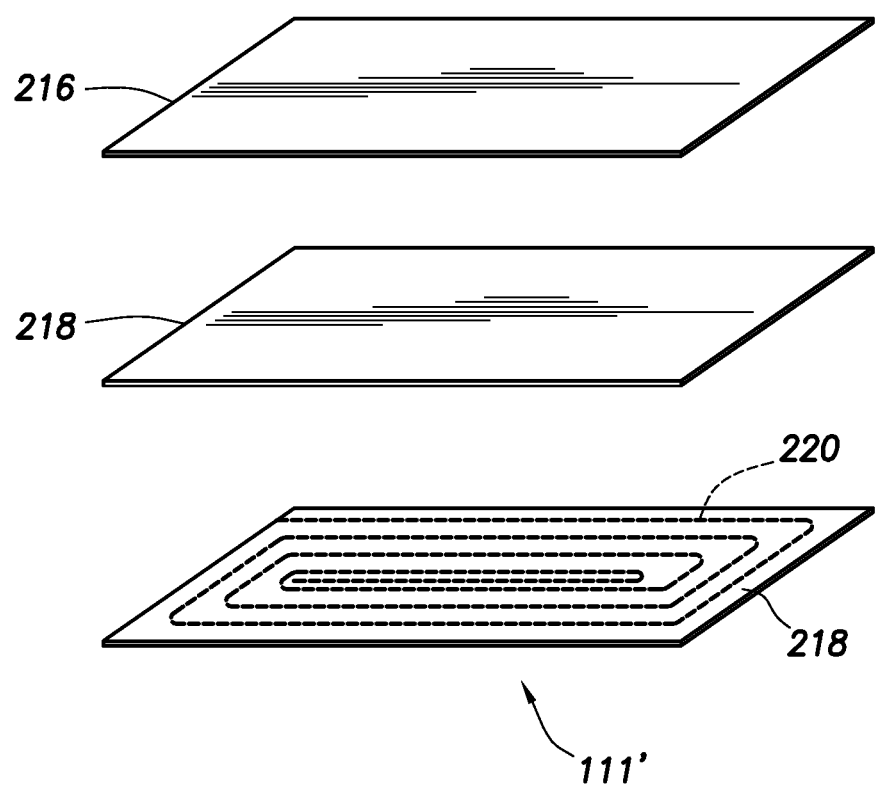

FIGS. 3A-3C depict an alternate sensor pad 111' usable with the seismic system 100 of FIG. 1. The sensor pad 111' includes an optical cable 220 secured into a desired position with a securing agent as shown in FIGS. 3A and 3B, and provided with protective layers thereabout as shown in FIG. 3C. The sensor pad 111' may be provided with various combinations of securing agents and/or protective layers for coating, protecting, securing and/or cushioning the optical cable 220.

As shown in FIGS. 3A and 3B, the optical cable 220 may be secured in a desired configuration using various securing agents. In FIG. 3A, the optical cable 220 is distributed onto a mat 218 from a spool 333 and secured to the mat 218 with a bonding agent 330, such as epoxy, glue, and the like. The bonding agent 330 is distributed at discrete locations about the mat 218 to secure (or bond) the optical cable 220 in place. The bonding agent is depicted as being applied in strips at various locations about the optical cable 220, but may be in any configuration sufficient to maintain the optical cable 220 in position.

Other securing agents may also be applied to the optical cable 220. FIG. 3B shows the optical cable 220 secured into position with an adhesive 332, such as rubber cement. The adhesive 332 may be used as a securing agent to secure the optical cable 220 in position. The adhesive 332 may also be used to coat the optical cable 220 and act as a protective layer thereon. The adhesive 332 may be used alone or in combination with the bonding agent 330. One or more securing agents, such adhesive 332, bonding agent 330 and/or other devices may be employed to secure the optical cable 220 in position. Such securing agents may also act as a protective layer over at least a portion of the optical cable 220.

FIG. 3C shows an assembly view of the sensor pad 111' with various protective layers usable therewith. The optical cable 220 is shown with the bonding agent 330 of FIG. 3A and the adhesive 332, but may have other features positioned thereabout, such as the neoprene layer 219 of FIG. 2. As shown in FIG. 3, additional protective layers, such as pad wafer 216, rubber mats 218 and/or other layers, may also be provided. The optical cable 220 with the various protective layers may be secured together using a securing agent, such as the bonding agent 330 and/or adhesive 332 to form alternate sensor pad 111'. The alternate sensor pad 111' may be bolted onto the base plate 105 as shown in FIG. 1.

In some cases, the optical cable 220 may be positioned in one or more protective layers during transport and/or assembly. In such cases, one or more pad wafers (e.g., plywood) 216 and/or mats (e.g., 0.5" (1.27 cm) rubber mat) 218 may be provided in the sensor pad 111' for assembly and/or transport. During transport, the protective layers may be bolted together about the sensor pad 111' and/or to the base plate 105. Once in position, one or more of the protective layers may be removed. In some cases, one or more of the protective layers and/or securing agents, such as adhesive 332, may be molded with the optical cable 220 into the neoprene layer 219 for operation therewith.

Other techniques may be used to secure the optical cable 220 in a desired position and/or protect the optical cable 220. While a specific arrangement of securing agents and protective layers are depicted, one or more such features may be positioned about the base plate 105 and the optical cable 220 to provide support thereto.

Figure 4:
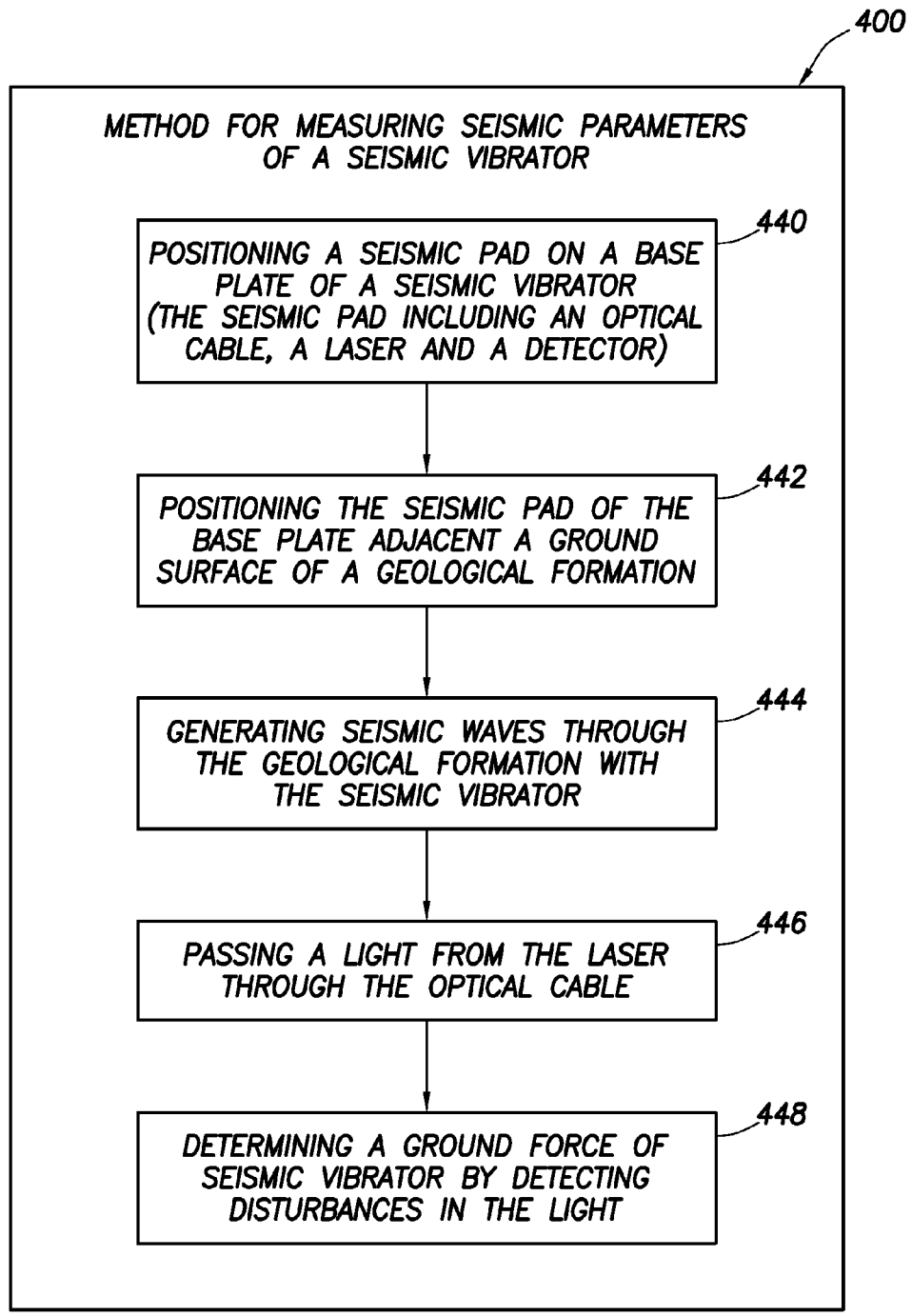
FIG. 4 is a flow chart depicting a method of measuring seismic parameters of a seismic vibrator.

FIG. 4 is a flow chart depicting a method 400 for measuring a seismic parameter, such as ground force, of a seismic vibrator. The method (400) may involve positioning (440) a seismic pad on a base plate of a seismic vibrator (the seismic pad comprising an optical cable, a laser, and a detector), positioning (442) the base plate with the seismic pad thereon adjacent a ground surface of a geological formation, generating (444) seismic waves through a geological formation with a seismic vibrator, passing (446) a light from the laser through the optical cable, and determining (448) a ground force of the seismic vibrator by detecting disturbances in the light. The method may also involve providing a protective layer about the optical cable and/or securing the optical cable in position. The steps of the method may be performed in a desired order, and repeated as desired.

While the present disclosure describes specific aspects of the invention, numerous modifications and variations will become apparent to those skilled in the art after studying the disclosure, including use of equivalent functional and/or structural substitutes for elements described herein. For example, aspects of the invention can also be implemented in one or more sensor pads and/or one or more optical cables of one or more seismic vibrators. All such similar variations apparent to those skilled in the art are deemed to be within the scope of the invention as defined by the appended claims.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A sensor pad for measuring seismic parameters of a seismic vibrator, the seismic vibrator for generating seismic waves through a geological formation, the seismic vibrator having a base plate positionable adjacent a ground surface of the geological formation, the sensor pad comprising:
    an optical cable positionable between the base plate of the seismic vibrator and the ground surface of the geological formation;
    a laser for passing a light through the optical cable; and
    a detector for detecting disturbances in the light whereby a ground force of the seismic vibrator may be determined.

2. The sensor pad of claim 1, wherein the optical cable is distributed over at least a portion of the base plate.

3. The sensor pad of claim 1, further comprising a protective layer positionable about the optical cable.

4. The sensor pad of claim 3, wherein the protective layer is selected from the group consisting of neoprene molded about the optical cable, a mat, a pad wafer, an adhesive layer, and combinations thereof.

5. The sensor pad of claim 1, further comprising a securing agent between the cable and the base plate.

6. The sensor pad of claim 1, wherein the optical cable is one of a single mode fiber optic cable, a multi-mode fiber optic cable, a microelectromechanical optical cable, a distributed optical cable and combinations thereof.

7. The sensor pad of claim 1, further comprising at least one sensor.

8. The sensor pad of claim 1, wherein the seismic parameter is one of a ground force, a stress, a strain, and combinations thereof.

9. A method for measuring seismic parameters, comprising:
    positioning a seismic pad on a base plate of a seismic vibrator, the seismic pad comprising an optical cable, a laser, and a detector;
    positioning the seismic pad of the base plate adjacent a ground surface of a geological formation;
    generating seismic waves through the geological formation with the seismic vibrator;
    passing a light from the laser through the optical cable; and
    determining a ground force of the seismic vibrator by detecting disturbances in the light.

10. The method of claim 9, further comprising providing a protective layer about the optical cable.

* * * * *